June 19, 1956  P. B. MOONEY  2,750,725
TRACTOR MOUNTED PEANUT HARVESTER HAVING VIBRATING SEPARATING FINGERS
Filed March 20, 1953  4 Sheets-Sheet 1
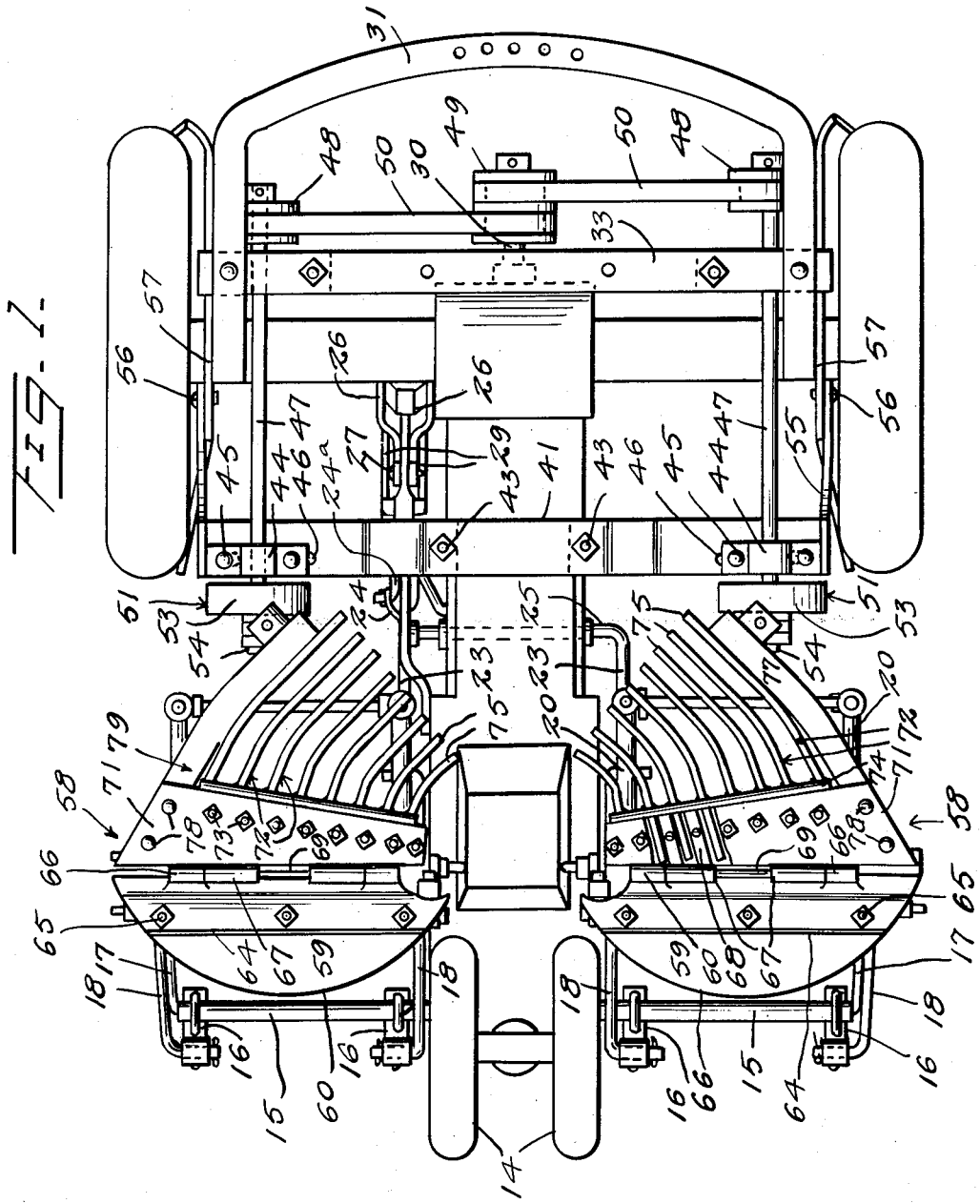
INVENTOR
Preston B. Mooney
BY John H. Randolph
ATTORNEY

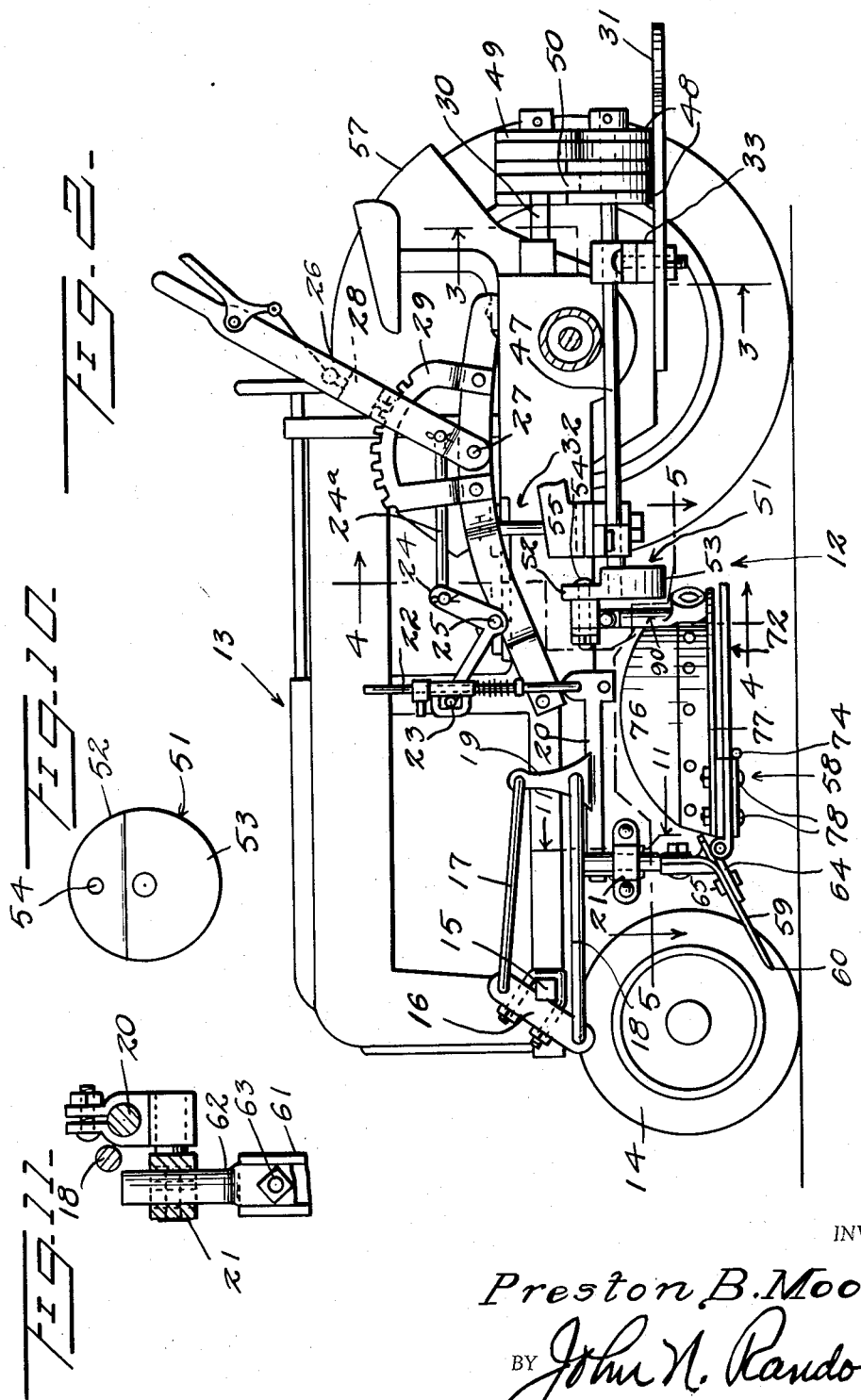

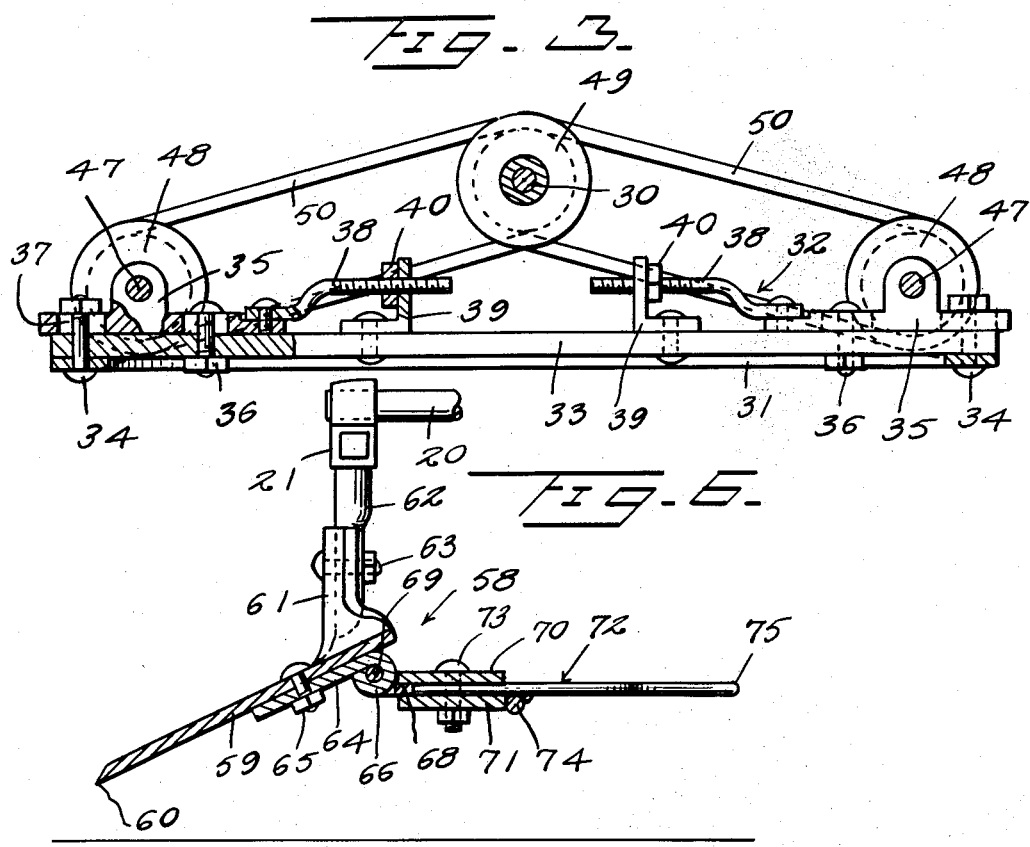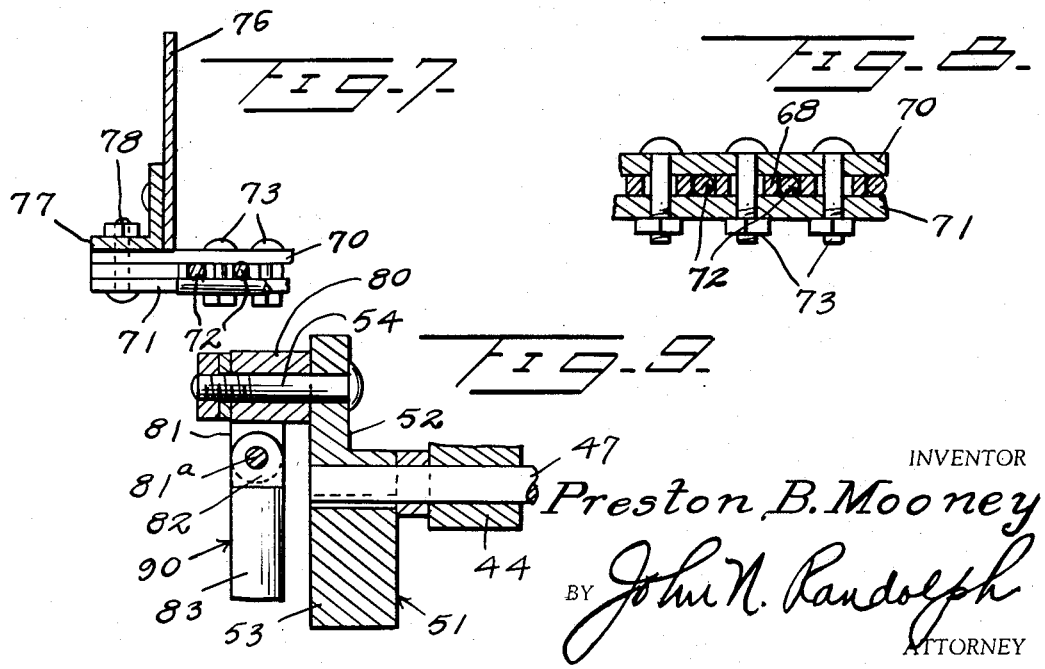

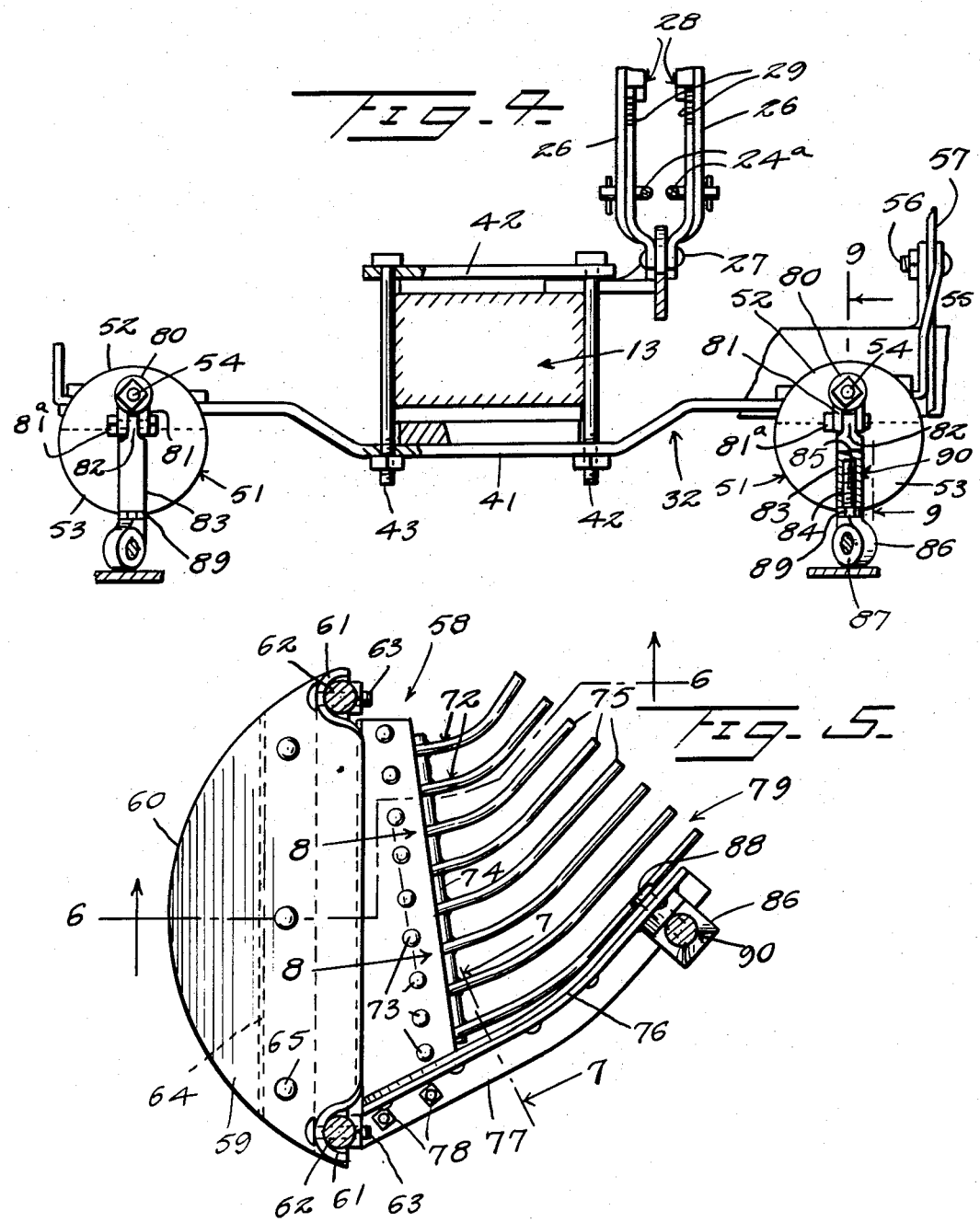

United States Patent Office 2,750,725
Patented June 19, 1956

2,750,725

TRACTOR MOUNTED PEANUT HARVESTER HAVING VIBRATING SEPARATING FINGERS

Preston B. Mooney, Okemah, Okla.

Application March 20, 1953, Serial No. 343,692

7 Claims. (Cl. 55—142)

This invention relates to an attachment of extremely simple construction capable of being readily mounted detachably on a conventional "Farmall" type of tractor and adjustably supported and driven thereby for mounting cutting blades of the attachment at desired sub-surface levels for cutting peanut vines and for simultaneously agitating shaker fingers disposed above the ground and onto which the vines are directed by the blades for separating dirt from the vines during the passage thereof over the shaker fingers.

Another object of the invention is to provide a harvesting attachment for conventional tractors which may be quickly and easily applied thereto or removed therefrom and which will utilize power derived from the tractor power takeoff shaft for operation of the attachment.

A further object of the invention is to provide a harvesting attachment wherein the agitated shaking means will deliver cut and cleaned vines inwardly from both sides of the tractor for discharging the vines in a single windrow.

Various other objects and advantages of the invention will hereinafter become more fully apparent from the following description of the drawings, illustrating a presently preferred embodiment thereof, and wherein:

Figure 1 is a bottom plan view showing the attachment applied to a conventional tractor of the "Farmall" type;

Figure 2 is a side elevational view thereof;

Figure 3 is an enlarged cross sectional view taken substantially along a plane as indicated by the line 3—3 of Figure 2;

Figure 4 is an enlarged cross sectional view taken substantially along a plane as indicated by the line 4—4 of Figure 2;

Figure 5 is an enlarged horizontal sectional view of one of the digging and shaking units taken substantially along a plane as indicated by the line 5—5 of Figure 2;

Figure 6 is a vertical sectional view taken substantially along a plane as indicated by the line 6—6 of Figure 5;

Figure 7 is a transverse vertical sectional view taken substantially along a plane as indicated by the line 7—7 of Figure 5;

Figure 8 is an enlarged transverse sectional view taken substantially along a plane as indicated by the line 8—8 of Figure 5;

Figure 9 is an enlarged vertical sectional view taken substantially along a plane as indicated by the line 9—9 of Figure 4;

Figure 10 is a front elevational view of a part of the attachment, and

Figure 11 is an enlarged fragmentary transverse vertical sectional view taken substantially along a plane as indicated by the line 11—11 of Figure 2.

Referring more specifically to the drawings, the tractor attachment in its entirety is designated generally 12 and is adapted to be mounted on a conventional tractor 13 of the type commonly known as a "Farmall" tractor, or similar tractors of the same type having units at each side thereof for detachably and adjustably mounting cultivator attachments and employed for crop row cultivation.

The tractor 13 as illustrated is of the conventional type commonly used for mounting cultivator attachments and has a relatively narrow chassis with closely disposed dual front steering wheels 14 mounted therebeneath. A transverse supporting beam 15 extends laterally from each side of the tractor near its forward end and each end of the beam 15 supports a pair of crossheads 16 to which the forward ends of a pair of supporting levers 17 and 18 are pivotally connected. The supporting levers 17 and 18 of each crosshead 16 are pivotally connected thereto above and below the beam 15 and the rear ends of the levers 17 and 18 of each crosshead 16 are pivotally connected to vertically spaced portions of a post 19 which is fixed to and rises perpendicularly from an intermediate portion of a supporting bar 20. The supporting bars 20 are disposed longitudinally of the tractor 13 and are provided at their forward ends with clamping units 21. The rear ends of the supporting bars 20 are supported by connecting rods 22 which are pivotally connected thereto and to cranks 23, one of which is disposed on each side of the tractor chassis for supporting the two bars 20, located on the same side of the chassis. Lever arms 24 extend upwardly from shafts 25 of the cranks 23 at angles to said cranks, both of the lever arms 24 being disposed on the same side of the tractor chassis. A pair of manually actuated levers 26 are pivotally mounted at their lower ends at 27 in side by side relationship on one side of the tractor 13 for forward and rearward swinging movement. Each lever 26 is equipped with a latching unit 28 including a stationary latch segment 29. The levers 26 are connected by links 24a to the lever arms 24, so that one lever 26 controls one crank 23 and the other lever 26 controls the other crank 23, located on the other side of the tractor 13. By swinging the levers 26 forwardly, the cranks 23 are swung downwardly, allowing the supporting bars 20 to move downwardly, or by swinging the levers 26 rearwardly, the cranks 23 are elevated for lifting the supporting bars 20 connected thereto. The levers 26 may be latched in different positions for maintaining the supporting bars 20 at any desired elevation within their range of movement. The pairs of levers 17 and 18 combine with the connecting rods 22 to maintain the supporting bars 20 in horizontal positions at all times. The tractor 13 is also provided with a power takeoff shaft 30 which extends from the rear end thereof above the usual tractor drawbar 31. The parts 14 to 31, previously described, are of conventional construction forming no part of the present invention but employed in connection with the attachment 12 which is uniquely adapted thereto.

The harvesting attachment 12 includes a supporting unit, designated generally 32, which is detachably secured to the tractor 13 for supporting the remainder of the unit 12 in combination with the supporting bars 20. The unit 32 includes a rear supporting bar 33, as best illustrated in Figure 3, which is disposed transversely of the rear portion of the tractor 13 and which is supported at its ends on and secured by fastenings 34 to the parallel side portions of the drawbar 31. A shaft bearing 35 is mounted on each end of the bar 33 by the fastenings 34 and additional nut and bolt fastenings 36, each of which engage slots 37 of the bearing 35 whereby adjustment of the bearings 35 longitudinally of the bar 33 and transversely of the tractor 13 may be accomplished. A threaded rod 38 is secured to and extends inwardly from the inner end of each bearing 35 and slidably through an upstanding post 39 which is fixed to and rises from the bar 33. Each rod 38 has a nut 40 threaded thereon.

The nuts 40 engage the remote sides of the posts 39 and may be turned for displacing the rods 38 outwardly through said posts to displace the bearings 35 away from one another.

The supporting unit 32 also includes a front crossbeam 41, the ends of which extend laterally from opposite sides of the tractor chassis between its rear axle and the rear ends of the supporting bars 20. The intermediate portion of the supporting beam 41 is disposed beneath a part of the tractor chassis and is detachably secured thereto by a clamping unit including a crossbar 42 which extends across an upper side of a portion of the tractor and which is connected to the crossbeam 41 by nut and bolt fastenings 43 which straddle said tractor chassis portion. Shaft bearings 44 are secured to the underside of the end portions of the crossbeam 41 by fastenings 45 which engage slots 46 of the beam 41 for adjustably positioning the bearings 44 relatively to one another and in longitudinal alignment with the bearings 35, in different adjusted positions of said bearings 35.

A pair of parallel shafts 47 extend through and are journalled in the aligned bearings 35 and 44. The rear ends of the shafts 47 which are disposed rearwardly of the bearings 35 have belt pulleys 48 fixed thereto. A double belt pulley 49 is fixed to the power takeoff shaft 30 and is connected by endless belts 50 to the two belt pulleys 48 for driving the shafts 47. Unbalanced flywheels 51 are secured to the forward ends of the shafts 47, forwardly of the front bearings 44. Each flywheel 51, as best illustrated in Figure 10, has a lighter segment 52 of reduced thickness relatively to a heavier segment 53 thereof. A crankpin 54 is fixed to the lighter segment 52 and extends forwardly from the flywheel 51, eccentrically relatively to the flywheel center. The ends of the front crossbeam 41 are preferably braced by brace members 55 which are secured thereto and extend rearwardly therefrom. Rear portions of the brace members 55 are secured by fastenings 56 to rear wheel fenders 57 of the tractor 13.

The attachment 12 also includes a pair of corresponding vine harvesting and cleaning units, designated generally 58, each of which includes a plow or harvesting blade 59 which is relatively wide and which is preferably provided with a convexly rounded forward cutting edge 60. The ends of the back edge of the blade 59 are bent upwardly and forwardly and are vertically extended to provide standard receiving portions 61, each of which receives the lower end of a standard 62 which is secured thereto by a fastening 63. The upper ends of the standards 62 of the two vine digging and cleaning devices 58 are detachably secured in the clamps 21 for suspending said devices, near their forward ends from the forward ends of the bars 20, with one of said devices located on each side of the tractor chassis. As the standards 62 are rigidly connected to the blades 59, said blades are supported immovably relatively to the bars 20.

An elongated hinge leaf 64 is disposed along the underside of each blade 59 near its rear edge and is secured thereto by fastenings 65. The barrel portions 66 of the hinge leaves 64 are disposed beneath the back edges of the blades 59 and in alignment with barrel portions 67 of the hinge leaves 68. The hinge leaves 64 and 68 are connected by hinge pins which extend through said aligned barrel portions 66 and 67. Each hinge leaf 68 is disposed between upper and lower clamping plates 70 and 71, respectively. A plurality of tines or fingers 72 are also disposed between the clamping plates 70 and 71 of each unit 58 and said inner ends of the tines 72 and the hinge leaf 68 are clamped between the plates 70 and 71 by nut and bolt or other similar fastenings 73 which extend through the plates. The tines or fingers 72 extend outwardly from rear edges of the clamping plates 70 and 71 and are connected to one another and maintained in spaced apart substantially parallel relationship by a bar 74 which extends transversely thereof and which is connected to each of the tines 72. The bar 74 is disposed along the back edges of the clamping plates 70 and 71. The tines 72 of each unit 58 are curved intermediate of their ends so that the rear or free ends 75 thereof extend diagonally inwardly and rearwardly with respect to the longitudinal center of the attachment 12.

An upstanding deflector wall 76 is disposed along the outermost tine 72 of each unit 58 and has an outturned base flange 77. The forward end of the wall 76 and its base flange 77 are disposed over an outer end of the upper clamp plate 70 and said base flange is secured thereto by fastenings 78. The wall 76 combines with the tines 72, clamp plates 70 and 71 and the hinge leaf 68 to form a shaking section 79 of each unit 58.

A bearing sleeve 80 is journalled on each crankpin 54 and has a pair of depending apertured ears 81 to receive an apertured restricted upper end 82 therebetween of an upper hanger sleeve section 83. A pivot pin 81a extends through the ears 81 and the extension or eye 82 for swingably connecting the hanger section 83 to the bearing 80 for forward and rearward swinging movement relatively to the flywheel 51. The hanger section 83, as best seen in Figure 4, has an internally recessed and threaded lower portion 84 to receive an upstanding threaded stem 85 of a lower hanger section 86, the lower end of which constitutes an eye 87 which turnably fits a pin or fastening 88. The pin or fastening 88 is anchored in and extends outwardly from a rear portion of the deflector wall 76. A jamb nut 89 threadedly engages the stem 85 and is tightened against the lower end of the upper hanger section 83 to hold the hanger, designated generally 90, in various extended positions. Each of the shaker sections 79 is supported adjacent its rear end and outer edge from the flywheel crank 54 disposed thereabove by a hanger or connecting rod 90.

From the foregoing it will be readily apparent that the tractor operator from his position on the tractor seat may manually operate the levers 26 for raising or lowering the supporting bars 20, which bars will be maintained in substantially horizontal positions and at different levels by the latch units of the levers 26 when engaged with the latch segments 29. The levers 26 are normally displaced substantially forward of their positions of Figure 2 so that the supporting bars 20 are lowered substantially to position the forward, sharpened edges 60 of the digging or plow blades 59 in sub-surface positions below the level of the bottom portions of the tractor wheels and with the shaker unit 79 located slightly above the ground level.

Assuming that the power takeoff shaft 30 is being driven by the tractor engine as the tractor 13 is being propelled forwardly or from right to left of Figure 2, as the tractor moves forwardly the forward portion of the plow or digging blades 59, which are disposed below the ground level, will cut the vines of two vine rows between which the front wheels 14 are moving, for example peanut vines. The vines of the two rows, not shown, which are cut adjacent their roots, will be deflected upwardly by the upward and rearward inclination of the blades 59 as the tractor 13 moves forwardly and will pass over the upper rear edges of the blades 59, which constitute aprons disposed over the hinges 66, 67, 69. The vines will pass off the rear edges of the blades 59 onto the upper clamp plates 70 of the two shaker or agitator units 79. The vines thus falling on the plates 70 will be directed rearwardly onto the tines or fingers 72 by other following vines and also by the vertical oscillating movement of the shaker 79, especially when said shaker units are swinging downwardly.

While the blades 59 are maintained stationary with respect to the tractor 13 in their adjusted positions, as previously described, the two agitator or shaker units 79 are oscillated rapidly by rotation of the power takeoff shaft 30 which drives the two shafts 47 through the belt and pulley drives 50, 48, 49 causing rotation of the unbalanced flywheels 51. As the crankpins 54 of said flywheels swing downwardly a downward thrust is exerted thereby on the hangers or connecting rods 90, which connect the crankpins 54 to the rear portions of the agitator units 79, thus causing said agitator units to swing downwardly about the hinge axes 69. Likewise, as the crankpins 54 travel upwardly the hanger members 90 exert an upward pull on the agitator units 79 for swinging said units upwardly. This vertical oscillating movement of the agitator units 79 is relative to the blades 59 and is accomplished at a high rate of speed. The weighted flywheel portions 53 function as counterweights for the agitator units 79 to counterbalance the weight of said units at least partially while the crankpins 54 are swinging upwardly and downwardly to maintain a substantially uniform load on the power takeoff shaft 30. The agitator units 79 are illustrated in Figure 2 in substantially their uppermost positions of swinging movement and is illustrated in a substantially horizontal plane. Accordingly, while said agitator units are inclined downwardly and rearwardly the vines will slide rearwardly thereof over the tines or cleaning fingers 72 and the rapid agitation of said units 79 will cause dirt to be shaken loose from the vines and separated therefrom by being discharged between the fingers 72. The vines will continue to move rearwardly over the fingers 72 and will be deflected inwardly toward the longitudinal center of the tractor 13 by the outer deflector wall 76, so that the vines from both agitator units 79 will be discharged from the free ends 75 of the agitator fingers in a single windrow beneath the longitudinal center of the tractor 13.

Obviously, the attachment 12 may be utilized in the manner as previously described for other growths than peanuts to be harvested.

Various modifications and changes are contemplated and may obviously be resorted to, without departing from the spirit or scope of the invention as hereinafter defined by the appended claims.

I claim as my invention:

1. A harvesting attachment for tractors comprising, in combination with a tractor having a power takeoff shaft and separately controlled manually actuated cultivator supporting units mounted on either side of the forward portion of the tractor and vertically adjustable relatively to the ground over which the tractor in moving, a pair of harvesting blades, standards fixed to and rising from said blades and detachably secured to said supporting units for demountably supporting said blades individually beneath the supporting units, said blades being inclined downwardly and forwardly from their rear edges to their forward edges and being adjustably supported by the supporting units with their forward portions in sub-surface positions for digging vines of two rows and having their upper rear portions disposed in elevated positions relatively to the ground level, an agitator unit having a forward portion hingedly connected to the underside of each blade beneath and adjacent the upper rear edge thereof and extending rearwardly therefrom, said agitator units each including a plurality of transversely spaced fingers constituting the rear portion of the agitator unit; a supporting structure detachably secured to the tractor, bearings supported by said supporting structure, a pair of shafts journalled in said bearings, means forming a driving connection between said shafts and the power takeoff shaft, said shafts being disposed in substantially horizontal planes, a crankpin eccentrically connected to each of said shafts, and connecting rods connected to said crankpins and pivotally connected directly to rear portions of the agitator units for positively oscillating the agitator units vertically in both directions when the power takeoff shaft is revolved for conveying vines rearwardly over said units from the blades and for violently agitating the vines during their travel over the separator fingers for separating dirt therefrom.

2. An attachment as in claim 1, said agitator units being supported by the crankpins and connecting rods in substantially horizontal planes in the uppermost positions of their swinging movement and being curved inwardly toward one another from their hinged forward ends to their rear discharge ends for discharging the vines from the two agitator units in a single windrow.

3. An attachment as in claim 2, each of said agitator units having an upstanding deflector wall extending along an outer convex edge thereof and curved inwardly from the forward to the rear end thereof.

4. An attachment as in claim 1, an unbalanced flywheel fixed to each of said shafts on which the crankpin is mounted eccentrically of the shaft, each of said flywheels having a weighted segment spaced from the flywheel portion on which the crankpin is mounted for counterbalancing the weight of the agitator unit connected to said crankpin.

5. An attachment as in claim 1, said connecting rods being extensible and retractable for varying the elevation of the rear discharge ends of the agitator units in their uppermost and lowermost positions of swinging movement.

6. An attachment as in claim 1, the ends of the rear edge portion of each blade being upwardly and forwardly flared to define rearwardly opening recesses in which the lower ends of said standards are secured and to provide forwardly facing deflector portions for deflecting the vines inwardly from adjacent the ends of the back edge of the blades.

7. A harvesting attachment for a tractor comprising, in combination with a tractor having a power takeoff shaft and a vertically adjustable manually actuated cultivator supporting unit, a harvesting plow blade, supporting means secured to and rising from a rear edge of the blade and detachably secured to said tractor cultivator supporting unit for supporting the blade therebeneath at different elevations, said blade being inclined downwardly and forwardly from its rear edge and being supported in an operative position with its forward portion below the ground level and its rear portion above the ground level, and agitating unit having a forward end hingedly connected in the underside of the blade adjacent its upper rear edge and extending rearwardly therefrom, said agitating unit including a plurality of transversely spaced separator fingers, a supporting structure detachably connected to the tractor, bearings supported by said supporting structure, a shaft journalled in said bearings and disposed in substantially a horizontal plane, means forming a driving connection between said shaft and the tractor power takeoff shaft, a connecting rod pivotally connected to said agitator unit adjacent its rear end, and a crankpin eccentrically connected to said shaft and pivotally connected to said connecting rod for positively oscillating the agitator unit vertically in both directions when said shaft is revolved, said crankpin and connecting rod preventing upward swinging movement of the agitator unit past substantially a horizontal position.

References Cited in the file of this patent

UNITED STATES PATENTS

| | | |
|---|---|---|
| 675,139 | Reuther | May 28, 1901 |
| 2,383,506 | McClenny | Aug. 28, 1945 |
| 2,384,522 | Averitt | Sept. 11, 1945 |
| 2,384,763 | Mooney et al. | Sept. 11, 1945 |